May 3, 1955
J. N. ROGERS
2,707,521
WIND MOTOR
Filed April 27, 1950
2 Sheets-Sheet 1
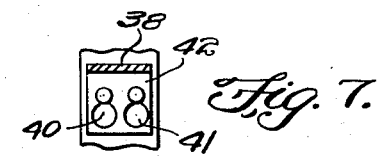
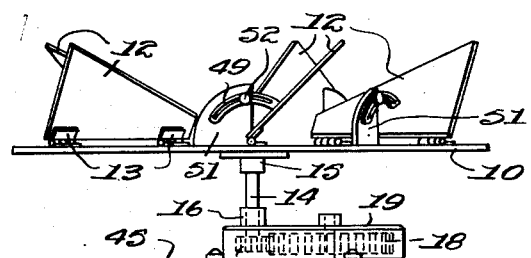
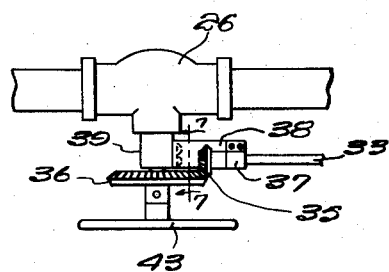
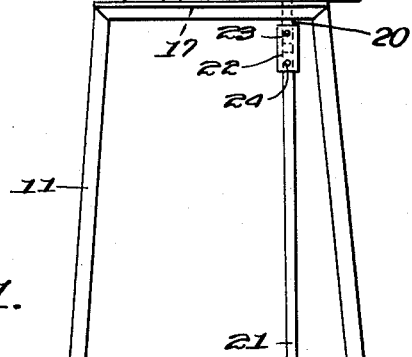
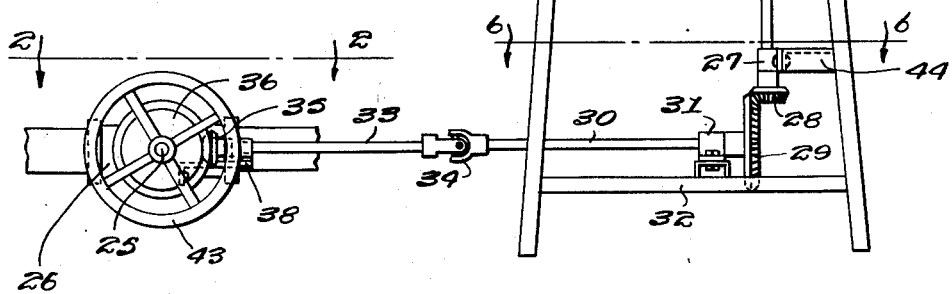
INVENTOR.
J. Norman Rogers,
BY Victor J. Evans & Co.
ATTORNEYS May 3, 1955 J. N. ROGERS 2,707,521
WIND MOTOR
Filed April 27, 1950 2 Sheets-Sheet 2
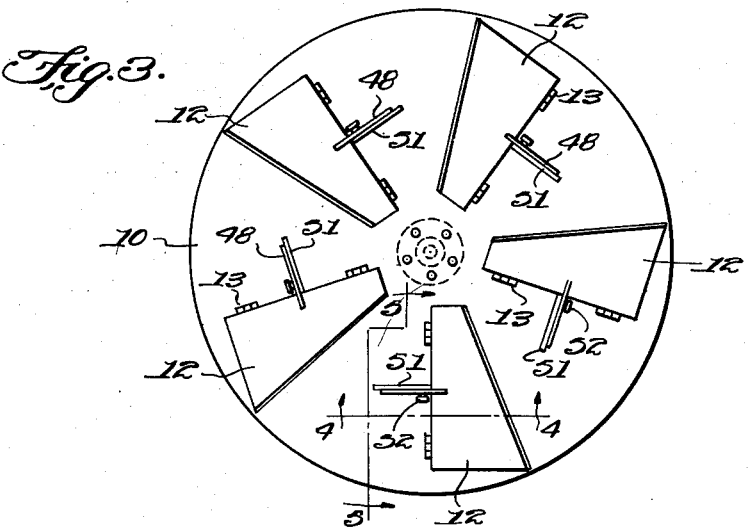
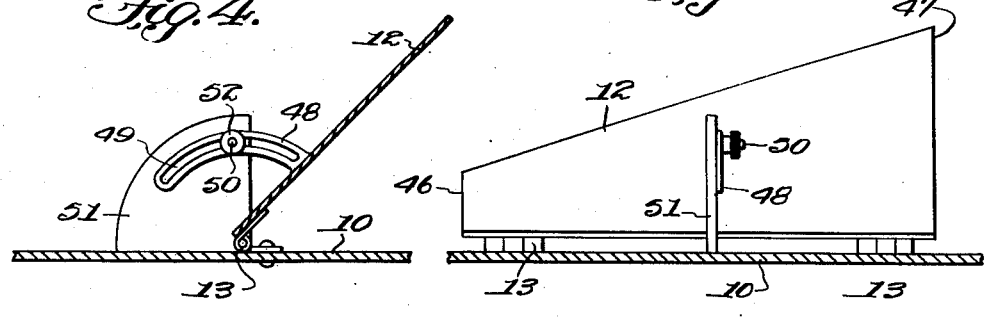
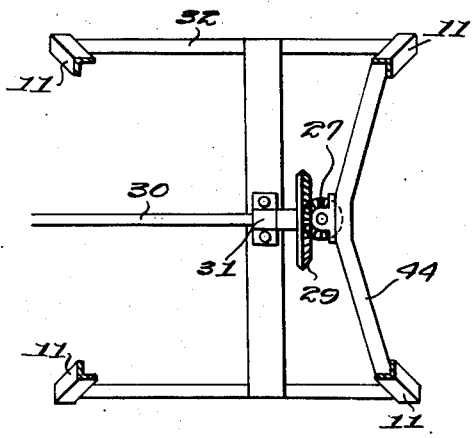
INVENTOR.
J. Norman Rogers,
BY Victor J. Evans & Co.
ATTORNEYS

United States Patent Office 2,707,521
Patented May 3, 1955

2,707,521

WIND MOTOR

Joseph Norman Rogers, Gretna, La.

Application April 27, 1950, Serial No. 158,513

3 Claims. (Cl. 170—34)

This invention relates to emergency devices particularly adapted for closing valves in marine producing oil well pipe lines where the valves are inaccessible during storm periods, and in particular the invention relates to a valve closing device positioned in the path of the wind in a storm area wherein blades hinged to a rotatably mounted disc may set so that when the wind reaches a predetermined velocity the blades actuate the device and the device closes a valve to which it may be connected.

The purpose of this invention is to provide a valve closing device that is automatically actuated when wind reaches a predetermined velocity to close a valve in an emergency and particularly in inaccessible storm areas.

In marine oil well fields positioned in storm areas it is necessary to close valves in pipe lines and under certain conditions it is substantially impossible to reach the valves. With this thought in mind this invention contemplates a valve device that automatically operates when the wind reaches a predetermined velocity to close a valve to which it is connected.

The object of this invention is, therefore, to provide means for forming a wind actuating valve closing device whereby vanes thereon may be set to cause the device to operate to close a valve when wind blowing over the device reaches a certain velocity.

Another object of the invention is to provide a valve closure for automatically closing a valve in an emergency that may readily be installed on valves now in use.

A further object of the invention is to provide an emergency wind operated valve closing device which is of a simple and economical construction.

With these and other objects and advantages in view the invention embodies a horizontally disposed disc journaled on the upper end of a stand with radially disposed vanes hinged to the upper surface of the disc and provided with means for adjusting the positions thereof, and means connecting the disc to a valve for closing the valve as the disc rotates.

Other features and advantages of the invention will appear from the following description taken in connection with the drawings wherein:

Figure 1 is an elevational view illustrating the device positioned on a stand and geared to the stem of a valve in a pipe line.

Figure 2 is a plan view of a valve in a pipe line illustrating the connection of the closing device to the valve, said view being taken on line 2—2 of Figure 1.

Figure 3 is a plan view of the disc showing the vanes positioned thereon.

Figure 4 is a cross section through the disc on an enlarged scale and taken on line 4—4 of Figure 3 illustrating the means for adjusting the position of the vanes.

Figure 5 is a similar section taken at right angles to that shown in Figure 4 being taken on line 5—5 of Figure 3 and also showing one of the vanes on the disc.

Figure 6 is a sectional plan taken on line 6—6 of Figure 1 showing the gear mountings in the lower end of the stand.

Figure 7 is a detail showing a section taken on line 7—7 of Figure 2 and illustrating a slotted connection through which the valve operating gears are disconnected for manual operation of the valve.

Referring now to the drawings wherein like reference characters denote corresponding parts the wind operated valve closing device of this invention includes a disc 10 journaled on a stand 11 and having vanes 12 pivotally mounted on the upper surface by hinges 13.

The disc 10 is mounted on the upper end of a stub shaft 14 through a hub 15 and the shaft is journaled in a bearing 16 mounted on the stand. The lower end of the shaft 14 is provided with a gear 17 that meshes with a gear 18 positioned in a gear housing 19 and mounted on the upper end of a shaft 20 that is connected to a vertically disposed shaft 21 through a coupling 22 with shear pins 23 and 24 positioned in opposite ends of the coupling. The pin 23 extends through the lower end of the shaft 20 and the pin 24 extends through the upper end of the shaft 21 whereby as an excessive load is placed on the coupling the pins will shear. By this means the device operates to rotate the valve stem 25 to close the valve 26 and when the valve is closed the pins shear whereby the disc 10 rotates free of the valve closing instrumentalities.

The lower end of the vertically disposed shaft 21 is journaled in a bearing 27 and a gear 28 on the lower end meshes with a gear 29 on a shaft 30 that is journaled in a bearing 31 on a support 32 extended across the stand 11. The outer end of the shaft 30 is connected to a shaft 33 through a universal coupling 34 and a gear 35 on the shaft 33 meshes with a gear 36 on the valve stem 25 providing means for rotating the valve stem to close the valve as the shafts are rotated. The outer end of the shaft 33 is journaled in a bearing 37 on a bracket 38 and the bracket is mounted on the valve housing 39 through slotted openings 40 and 41 in a downwardly extended flange 42 at the end thereof, as shown in Figure 7. With the bracket 38 mounted in this manner bolts by which the bracket is secured to the valve housing may be loosened whereby the shaft 33 with the gear 35 may be dropped downwardly to release the valve stem so that the valve may be closed by a hand wheel 43. The lower end of the frame 11 is provided with an inwardly extended strut 44 on which the bearing 27 of the shaft 21 is positioned. The stand 11 is formed with corner posts, connected at the upper ends by a platform 45.

The vanes 12 that are hinged to the upper surface of the disc 10 by the hinges 13 are formed with sloping upper edges providing small inner ends 46 and comparatively large outer ends 47. These vanes are provided with arcuate arms 48 having slots 49 therein, which are formed on a radius on the center of the hinge 13 and threaded studs 50 on supports 51 extend through the slots. The studs 50 are provided with thumb nuts 52 by which the vanes may be secured in adjusted positions.

With the vanes arranged in this manner they may be set to positions parallel to the disc 10 or at right angles thereto or they may be set to any desired angle less than 90 degrees whereby the positions of the vanes control the speed of rotation of the disc 10 and when the velocity of the wind reaches a predetermined number of miles per hour the disc is rotated to close the valve, as described.

It will be understood that the vanes may be attached to the disc by any other means and also that the positions of the vanes may be adjusted by other means.

It will be understood that modifications may be made in the design and arrangement of the parts without departing from the spirit of the invention.

What is claimed is:

1. In a wind velocity actuated control device, the combination which comprises a stand, a vertically disposed shaft journaled on said stand, a disc mounted on the upper end of said shaft, radially disposed substantially rectangular shaped vanes having upwardly and outwardly sloping upper edges hinged to the upper surface of said disc, arcuate arms having elongated slots therein extended from said vanes, vertically positioned supports mounted on said disc and positioned whereby said arcuate arms slide against side surfaces thereof, means for clamping said arcuate arms in adjusted positions on said supports for adjusting the angular positions of said blades for regulating the rotation of the disc in relation to the wind velocity, and power take-off means connected to said shaft.

2. In a wind velocity actuated control device, the combination which comprises a stand, a vertically disposed shaft journaled on said stand, a disc mounted on the upper end of said shaft, radially disposed vanes hinged to the upper surface of said disc, said vanes being positioned with the lower edges thereof parallel to the surface of the disc and with extended edges inclined upwardly from the inner to the outer ends thereof, arcuate arms having elongated slots therein extended from said vanes, vertically positioned supports mounted on said disc and positioned whereby said arcuate arms slide against side surfaces thereof, means for clamping said arcuate arms in adjusted positions on said supports for regulating the rotation of the disc in relation to the wind velocity, and power take-off means connected to said shaft.

3. In a wind velocity actuated control device, the combination which comprises a stand, a vertically disposed shaft journaled on said stand, a disc mounted on the upper end of said shaft, radially disposed vanes hinged to the upper surface of said disc, said vanes being positioned with the lower edges thereof parallel to the surface of the disc and with extended edges inclined upwardly from the inner to the outer ends thereof, arcuate arms having elongated slots therein extended from said vanes, vertically positioned supports mounted on said disc and positioned whereby said arcuate arms slide against side surfaces thereof, studs mounted in said supports and extended through the elongated slots of said arcuate arms and thumb nuts threaded on said studs for clamping the arcuate arms in adjusted positions on said supports for regulating the rotation of the disc in relation to the wind velocity, and power take-off means connected to said shaft.

References Cited in the file of this patent
UNITED STATES PATENTS

| Number | Name | Date |
|---|---|---|
| 12,298 | Wallis | Jan. 23, 1855 |
| 447,216 | Waldrop | Feb. 24, 1891 |
| 1,292,225 | Araiza | Jan. 21, 1919 |
| 1,360,919 | Garside | Nov. 30, 1920 |
| 1,836,693 | Urfer | Dec. 15, 1931 |
| 1,864,868 | Soderberg | June 28, 1932 |
| 1,963,196 | Frisch | June 19, 1934 |
| 2,104,660 | Long | Jan. 4, 1938 |
| 2,441,635 | Iverson | May 18, 1948 |